Jan. 11, 1966 L. BERMAN 3,229,219
PLURAL LOOP AUTOMATIC FREQUENCY CONTROLS
Filed March 3, 1961
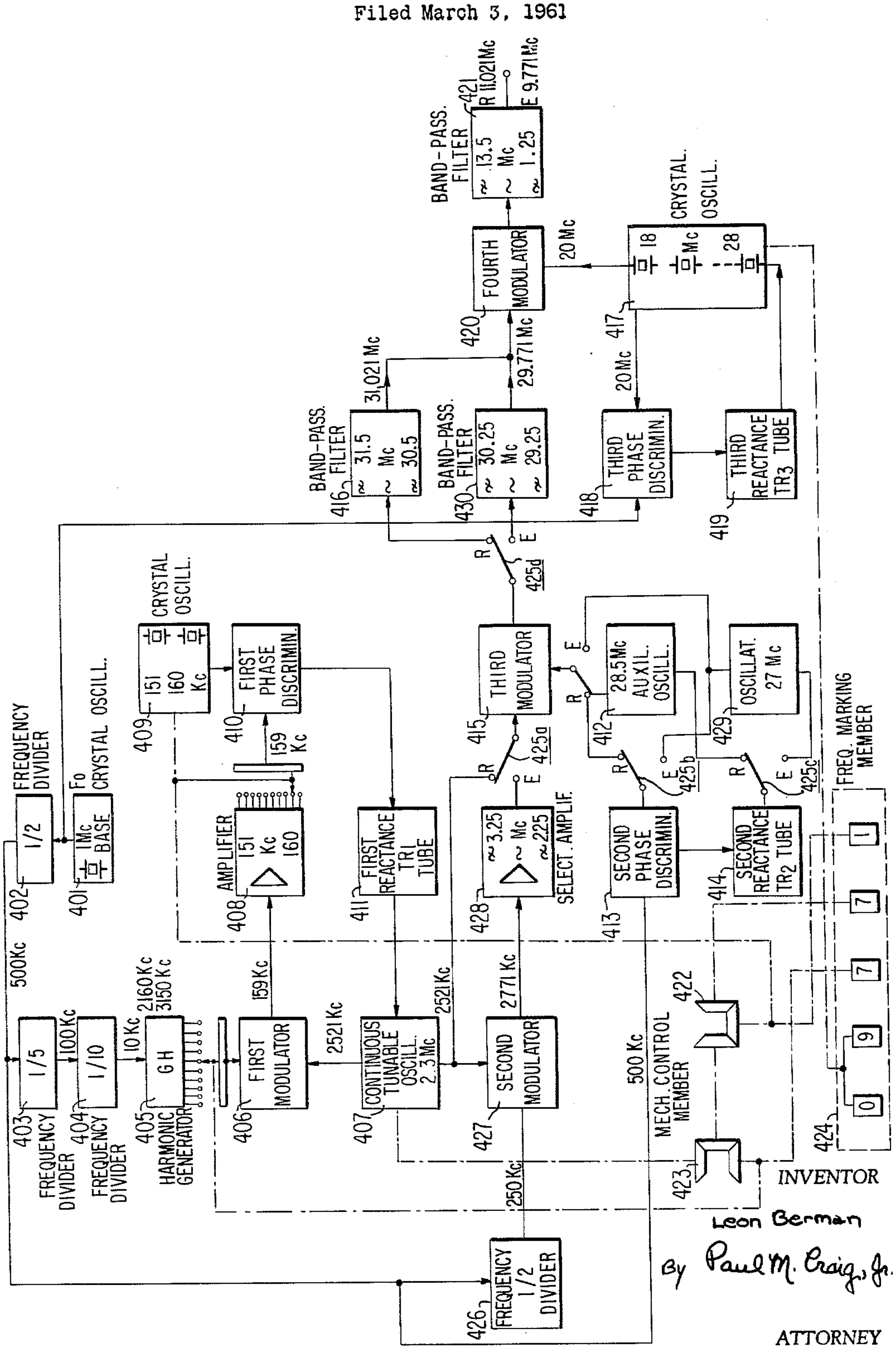
INVENTOR
Leon Berman
By Paul M. Craig, Jr.
ATTORNEY United States Patent Office 3,229,219
Patented Jan. 11, 1966

3,229,219

PLURAL LOOP AUTOMATIC FREQUENCY CONTROLS

Leon Berman, Asnieres (Seine), France, assignor to Cit-Compagnie Industrielle des Telecommunications, Paris, France Filed Mar. 3, 1961, Ser. No. 93,184
Claims priority, application France, Mar. 11, 1960, 821,069
4 Claims. (Cl. 331—2)

Frequency generators are known which are graduated, for example from kilocycle to kilocycle, in a range which may go up to several hundreds or thousands of kilocycles, starting from a frequency $F_0$, most frequently equal to 1 mc./s. or 100 kc./s., supplied by a crystal oscillator of very high stability. Such a device comprises a harmonic generator of 10 kc./s. supplied, by the intermediary of frequency dividers, from a crystal oscillator, an auxiliary oscillator supplying a controllable frequency F, a modulator to which are applied, on the one hand, the said frequency F and, on the other, one of the said harmonics of 10 kc./s., and in the output of which one collects a frequency $f_1$ which is applied to a comparator device. The comparator device gives an error signal which is applied to a variable-reactance device which corrects the frequency F of the oscillator in the desired direction, in order to make it equal to a predetermined frequency, defined by integral number of kilocycles per second, with a relative error which does not exceed the limit of stability of the reference oscillator, for example, $10^{-7}$.

The servo means used in such devices may utilise one of the two following methods (the numerical values of the auxiliary frequencies being given solely as an example):

(1) The frequency F is expressed by $F=(1000N4+100N3+10N2+N1+\epsilon)$ kc./s. in which $N_1$, $N_2$, $N_3$, $N_4$, are integers between 0 and 9, and designates the difference between the frequency F and the nominal frequency desired, said difference being of the order of a small fraction of a kilocycle.

In a first modulator, this frequency is subtracted from the synchronised frequency:

$1000N4+100N3+10(N2+8)$ kc./s. resulting in a frequency $(70+10=N1-\epsilon)$ kc./s., that is $(71 \text{ to } 80)-\epsilon$ kc./s., which is subtracted, in a second modulator from one of the ten stabilised frequencies: $70+(10-N1)+25$ kc./s. i.e. 96 to 105 kc./s.; a frequency $f=(25+\epsilon)$ kc./s. is obtained, which is compared in a suitable device with the synchronized frequency $fo=25$ kc./s. obtained by dividing $F_0$. This results in an error signal, which, applied to a device with variable reactance, causes F to vary in the direction required to reduce $\epsilon$ (2) The frequency $$F=(1000N4+100N3+10N2+N1+\epsilon)$$

kc./s. is subtracted in a modulator from the synchronised frequency $1000N4+100(N3+1)+10(N2+6)$ kc./s.

We obtain $150+(10-N1)-\epsilon$ kc./s., i.e.

$$(151 \text{ to } 160)-\epsilon \text{ kc./s.,}$$

which is compared, in a device operating at variable frequency, with the frequency $150+(10-N1)$ kc./s., selected from a group of ten stabilised frequencies 151 to 160 kc./s. As in the previous case, this results in a correction signal which ensures the synchronisation of the frequency F.

In order to put these methods into use, the servo device comprises a variable-frequency oscillator F, linear in frequency within about 0.1%; it is thus possible to show the nominal value of the desired frequency by means of mechanical members which simultaneously effect on the one hand, a continuous adjustment of the variable oscillator, and on the other hand intermittent selections of the synchonised or stabilised frequencies, entering into the modulators, which makes it possible to obtain the desired synchronised frequency very rapidly and with the minimum number of operations.

The above-mentioned generating devices also comprise means making it possible to obtain from the oscillation with continuous frequency variation, an extension of the useful range, said means consisting of an electrical frequency multiplier device (in a ratio 2, or 4 or 8) and a mechanical device which divides the speed of rotation of the mechanical control members in the same ratio, i.e. 2, or 4 or 8 respectively.

The object of the present invention is a device for the generation of frequencies synchronised by a high-stability crystal oscillator, similar to the aforementioned generating devices with regard to the operation and synchronisation of the continuously varying oscillator, but different with respect to the extension of the range of use.

The device according to the present invention, which makes it possible to obtain a band of several megacycles, is characterised in, that it comprises means for obtaining two successive frequency transpositions, one of which employs a frequency of synchronised modulation, and the other a frequency chosen from a group of synchronised frequencies spaced from megacycle to megacycle, said modulation frequencies being chosen in such a way that no spurious modulation products appear in the pass bands.

The device in accordance with the invention will now be described in detail for the particular case of a frequency generator for "transmission-reception" traffic with single side-band, the range covered in transmission being 1,250–12.250 mc./s. Reference will be made to the single figure hereto attached in which:

401 is a high stability crystal-controlled oscillator to be referred to hereinafter as base oscillator, supplying a voltage of 1 mc./s. frequency.

402 is a frequency divider by 2, supplying a voltage of 500 kc./s.,

403 is a frequency divider by 5, supplying a voltage of frequency 100 kc./s.,

404 is a frequency divider by 10, supplying a voltage of frequency 10 kc./s.,

405 is a harmonic generator supplying synchronised frequencies, spaced by steps of 10 kc./s. between 2,160 and 3,150 kc./s. and in the output of which a 10-position selector device makes it possible to choose one of the 10 bands 2,160–2,250 kc./s., 2,260–2,350 kc./s. . . . 3,060–3,150 kc./s.

406 is a modulator fed on one side by one of the bands supplied by the harmonic generator 405 and on the other side by the voltage supplied by the oscillator 407,

407 is an oscillator with linear frequency variation, supplying the range 2–3 mc./s.,

408 is an amplifier of 151–160 kc./s. pass-band, receiving the output signal of the modulator 406, and in the output of which are connected ten narrow-band filters respectively centered on 151, 152 . . . 160 kc./s. on,

409 is an oscillator adapted to supply one of the ten frequencies 151, 152 . . . 160 kc./s. crystal-stabilised.

The correspondence between the frequency F of the voltage supplied by the oscillator 407 and the 10 kc./s.-harmonic selected in the output of the harmonic generator 405 is established in accordance with the following table:

| F | Harmonics 1st position of selector | F | Harmonics 2nd position of selector | | F | Harmonics 10th position of selector |
|---|---|---|---|---|---|---|
| 2,000–2,009 | 2 160 | 2,100–2,109 | 2 260 | -------- | 2,900–2,909 | 3 060 |
| 2,010–2,019 | 2 170 | 2,110–2,119 | 2 270 | -------- | 2,910–2,919 | 3 070 |
| 2,020–2,029 | 2 180 | 2,120–2,129 | 2 280 | -------- | 2,920–2,929 | 3 080 |
| 2,030–2,039 | 2 190 | 2,130–2,139 | 2 290 | -------- | 2,930–2,939 | 3 090 |
| 2,040–2,049 | 2 200 | 2,140–2,149 | 2 300 | -------- | 2,940–2,949 | 3 100 |
| 2,050–2,059 | 2 210 | 2,150–2,159 | 2 310 | -------- | 2,950–2,959 | 3 110 |
| 2,060–2,069 | 2 220 | 2,160–2,169 | 2 320 | -------- | 2,960–2,969 | 3 120 |
| 2,070–2,079 | 2 230 | 2,170–2,179 | 2 330 | -------- | 2,970–2,979 | 3 130 |
| 2,080–2,089 | 2 240 | 2,180–2,189 | 2 340 | -------- | 2,980–2,989 | 3 140 |
| 2,090–2,099 | 2 250 | 2,190–2,199 | 2 350 | -------- | 2,990–2,999 | 3 150 |

410 is a phase dircriminator, of which the output signal acts on a reactance tube 411 or any other member with electronic variation of reactance, and consequently on the frequency of the voltage supplied by the oscillator 407.

The members 401–411 serve for the generation of a frequency comprised between 2 and 3 mc./s., varying by whole values of kilocycles, and synchronised by the high-stability oscillator which supplies the voltage of frequency $F_0$. The detailed operation of this device will be explained hereinbelow by means of an example.

412 is an oscillator supplying a frequency of 28.0 mc./s., synchronized by the slave-loop comprising a phase-discriminator 413 and a reactance tube 414, on the frequency of 500 kc./s. obtained in the output of the divider 402.

415 is a modulator which receives the frequency coming from the oscillator 407 and the frequency 28.5 mc./s. supplied by the oscillator 412, the sum of these two frequencies being picked up in the output of a filter 416, with 30.5–31.5 mc./s. pass-band.

427 is an oscillator stabilised by a crystal selected from a group of eleven crystals of which the frequencies are spaced by megacycles between 18 and 28 mc./s. and which are synchronised by means of the servo-loop formed by a phase discriminator 418 and a reactance tube 419.

420 is a modulator which, from the frequency collected in the output of the filter 416 and from the frequency supplied by the oscillator 417, produces the difference of said frequencies, which is then filtered by a band-filter 421.

422 and 423 are two mechanical control members, with differential gears, bound to members 424 for marking the frequency, and acting, on the one hand on the angular position of the variable capacitor of the oscillator 407, and on the other hand on the choice of the output filter of the amplifier 408 and of the crystal of the oscillator 409 (marking units of kilocycles) and on the choice of the output filter of the harmonic generator 405 (marking of hundreds of kilocycles). The marking of the tens of kilocycles is effected only by the continuous control members, without the intervention of a selective member.

425 *a, b, c, d* designates a 4-terminal 2-way switch, which makes it possible to change from "transmission" to "reception" without having to touch the members for marking the frequency.

We shall take as an example operation on "reception" with a traffic frequency of 9.771 mc./s., the mean frequency of the receiver, being fixed at 1,250 mc./s. and the transposition oscillation frequency to be supplied being equal to 9.771+1.250=11.021 mc./s.

By putting the three indices on the right of the member 424 for setting the frequency on position 771 (hundreds, tens, units of kilocycles), the oscillator 407 is adjusted to the frequency ($2,521+\epsilon$) kc./s., and at the same time the following are determined:

(1) The choice of the output filter of the harmonic generator 405, i.e. 2,260–2,750 kc./s.

(2) The choice of the output filter of the amplifier 408, i.e. 159 kc./s.

(3) The choice of the 159 kc./s. crystal of the oscillator 409.

Among the 10 kc./s. harmonics comprised in the 2,660–2,750 kc./s. band admitted in the modulator 406, appears the term 2,680 kc./s., which, with the frequency ($2,521+\epsilon$) kc./s. coming from the oscillator 407, gives in the output of the selective amplifier 408, the frequency ($159-\epsilon$) kc./s.

The comparison in the discriminator 410, of said frequency with the frequency 159 kc./s. supplied by the oscillator 49 stabilised by independent crystal (stability $5.10^{-6}$), supplies a servo-signal which, by means of the reactance tube 411, ensures the synchronisation of the frequency of 2,521 kc./s.

The frequency 2,521 kc./s., supplied direct by the synchronised oscillator 407, is applied to modulator 415 at the same time as the frequency of 28.5 mc./s. coming from the synchronized oscillator 412. In the output of the filter 416, is collected the frequency 31.021 mc./s. which, applied to the modulator 420, by combination with the synchronised frequency 20 mc./s., selected by the control of setting of the megacycles (9), gives the desired frequency 11.021 mc./s., in the output of the filter 421.

In operation in "transmission" (position E of the switch 425) the following members also come into use:

A frequency divider 426, which supplies a frequency of 250 kc./s. starting from the frequency 500 kc./s.

A modulator 427, which receives on one side 2,521 kc./s., on the other 250 kc./s. and produces the frequency 2,771 kc./s., which is applied in the output of a selective amplifier 428 to the modulator 415.

An oscillator 429, which supplies the frequency 27 mc./s., synchronised by the loop 413 (phase discriminator), 414 (reactance tube).

A filter 430, of 29.25–30.25 mc./s. pass-band which is substituted for the filter 416 in the output of the modulator 415.

In the output of filter 430, is picked up the frequency 29.771 mc./s., which, by combination with the synchronised 20 mc./s. frequency, supplies in the output of the filter 421 the attached transmission frequency of 9.771 mc./s.

The operation of adjustment on the frequency of the selected channel is controlled by the setting member, and the change-over transmission-reception is effected by operating the switch 425. These operations are easy and permit rapid selection of the connecting channel and convenient working of the link.

I claim:

1. In a single side band radio-electric transmitter-receiver station, a generator system for producing electric oscillations with stabilized frequency, comprising base oscillator means generating a frequency $F_0$ having a relatively high stability, frequency divider means operatively connected to the output of said base oscillator means for obtaining a frequency $F_o'=F_o/n$, where $n$ is an integer greater than 1, harmonic generator means having a plurality of outputs and connected to the output of said frequency divider means for producing in the outputs thereof of harmonics of the frequency $F_o$, first modulator means having two inputs and one output, first connecting means for selectively connecting one of the inputs of said first modulator means with a selected one of the outputs of said harmonic generator means, continuously tunable oscillator means, control means for controlling the frequency of said tunable oscillator means, said tunable oscillator means benig operatively connected with the other input of said first modulator means, first phase discriminator means having two inputs and an output, second connecting means operatively connecting the output of said first modulator means with one of the two inputs of said first phase discriminator means, a plurality of further oscillator means producing output frequencies, the other input of said first phase discriminator means being effectively connected to a selected one of said further oscillator means, third connecting means including variable reactance means operatively connecting the output of said first discriminator means to the input of said continuously tunable oscillator means, second modulator means having two inputs and an output, one of the two inputs of said second modulator means being connected to the output of said continuously tunable oscillator means, auxiliary oscillator means having an input and an output, synchronizing circuit means for said auxiliary oscillator means including second variable reactance means and second phase discriminator means operatively connecting the input of said auxiliary oscillator means with one of said frequency divider means, fourth connecting means operatively connecting the output of said auxiliary oscillator means with one input of a third modulator means having two inputs and an output, fifth connecting means operatively connecting the output of said second modulator means to one of the inputs of said third modulator means, still further oscillator means having input and output means, third phase discriminator means having two inputs and an output, sixth connecting means including third variable reactance means operatively connecting the output of said third phase discriminator means to the input means of said still further oscillator means, seventh connecting means effectively connecting the output means of a selected one of said still further oscillator means to one of the inputs of said third phase discriminator means, eighth connecting means for connecting to the other input of said third phase discriminator means to the output of said base oscillator means, ninth connecting means operatively connecting the output means of said still further oscillator means to one input of a fourth modulator means, the electric oscillations with stabilized frequency being collected in the output of the fourth modulator means, and mechanical means operatively connected with said further and still further oscillator means for controlling the selection thereof, with said first connecting means for controlling the selection of the harmonic supplied by said harmonic generator means and with control means for controlling the frequency of said continuously tunable oscillator means.

2. In a single side band radio-electric transmiter-receiver station, a generator system for producing electric oscillations with stabilized frequency, comprising base oscillator means generating a frequency $F_o$ having a relatively high stability, a series of frequency divider means operatively connected to the output of said base oscillator means for obtaining a frequency $F_o'=F_o/n$, wherein $n$ is an integer greater than 1, harmonic generator means having a plurality of outputs and connected to the output of said frequency divider means for producing in the outputs thereof harmonics of the frequency $F_o'$, first modulator means having two inputs and one output, first connecting means for selectively connecting one of the inputs of said first modulator means with a selected one of the outputs of said harmonic generator means, continuously tunable oscillator means having a continuous linear frequency variation and operable to supply integer frequency values in steps of a first number of cycles per second substantially smaller than the range of said frequency variation, control means for controlling the frequency of said tunable oscillator means, said tunable oscillator means being operatively connected with the other input of said first modulator means, first phase discriminator means having two inputs and an output, second connecting means including selective amplifier means operatively connecting the output of said first modulator means with one of the two inputs of said first phase discriminator means, a plurality of further crystal-controlled oscillator means producing output frequencies, the other input of said first phase discriminator means being effectively connected to a selected one of said further oscillator means, third connecting means including variable reactance means operatively connecting the output of said first discriminator means to the input of said continuously tunable oscillator means, second modulator means having two inputs and an output, one of the two inputs of said second modulator means being connected to the output of said tunable oscillator means, auxiliary oscillator means having an input and an output, synchronizing circuit means for said auxiliary oscillator means including second variable reactance means and second phase discriminator means operatively connecting the input of said auxiliary oscillator means with one of said frequency divider means, fourth connecting means operatively connecting the output of said auxiliary oscillator means with one input of a third modulator means having two inputs and an output, fifth connecting means including first band-pass filter means operatively connecting the output of said second modulator means to one of the inputs of said third modulator means, still further crystal-controlled oscillator means having input and output means, third phase discriminator means having two inputs and an output, sixth connecting means including third variable reactance means operatively connecting the output of said third phase discriminator means to the input means of said still further oscillator means, seventh connecting means effectively connecting the output means of a selected one of said still further oscillator means to one of the inputs of said third phase discriminator means, eighth connecting means for connecting the other input of said third phase discriminator means to the output of said base oscillator means, ninth connecting means operatively connecting the output means of said still further oscillator means to one input of a fourth modulator means, the electric oscillations with stabilized frequency being collected in the output of the fourth modulator means, and mechanical means operatively connected with said further and still further oscillator means for controlling the selection thereof, with said first connecting means for controlling the selection of the harmonic supplied by said harmonic generator means and with control means for controlling the frequency of said tunable oscillator means and including means for indicating the nominal value of the frequency of the oscillatory energy collected in the output of said fourth modulator means.

3. A system according to claim 1, wherein said harmonic generator means is operable to produce harmonics in steps of a number of cycles per second equal to said number $F_o'$ and wherein the number of said further oscillator means is equal to the number of said outputs of said harmonic generator means.

4. A system according to claim 2, wherein said harmonic generator means is operable to produce harmonics in steps of a number of cycles per second equal to said number $F_o'$ and wherein said further crystal-controlled oscillator means includes a number of crystal-controlled oscillators equal to the number of said outputs of said harmonic generator, said crystal-controlled oscillator means being operable to provide frequencies in steps of a number of cycles per second equal to said first number, said first number being equal to $F_o'$ divided by the number of said crystal-controlled oscillators.

References Cited by the Examiner

UNITED STATES PATENTS

| | | | |
|---|---|---|---|
| 2,704,329 | 3/1955 | Law | 331—26 |
| 2,775,701 | 12/1956 | Israel | 331—22 |
| 2,808,509 | 10/1957 | Felch et al. | 331—19 |
| 2,875,337 | 2/1959 | Robinson | 331—2 |
| 2,888,562 | 5/1959 | Robinson | 331—2 |
| 2,964,714 | 12/1960 | Jakubowcs | 331—2 |

OTHER REFERENCES

Article by Jacob in Electronics, February 1957, pages 152–155.

ROY LAKE, *Primary Examiner.*

JOHN KOMINSKI, *Examiner.*